United States Patent [19]

Smith

[11] Patent Number: 5,721,985
[45] Date of Patent: Feb. 24, 1998

[54] SHUTTER AND FLASH SYNCHRONIZATION ASSEMBLAGE

[75] Inventor: Stephen J. Smith, Shortsville, N.Y.

[73] Assignee: Eastman Kodak Company, Rochester, N.Y.

[21] Appl. No.: 818,144

[22] Filed: Mar. 13, 1997

[51] Int. Cl.$^6$ ............................................ G03B 17/26
[52] U.S. Cl. ............................ 396/195; 396/6; 396/493
[58] Field of Search ................................. 396/6, 195, 180

[56] References Cited

U.S. PATENT DOCUMENTS

| | | |
|---|---|---|
| 3,640,195 | 2/1972 | Zimmerman et al. . |
| 3,752,050 | 8/1973 | Wolfe . |
| 4,660,951 | 4/1987 | Reed et al. . |

*Primary Examiner*—David M. Gray
*Attorney, Agent, or Firm*—Roger A. Fields

[57] ABSTRACT

A shutter and flash synchronization assemblage comprising a flash circuit board having a shutter-flash synchronization contact, an electrically conductive shutter blade supported for movement between a lens covering position spaced from the synchronization contact and a lens uncovering position in abutment with the synchronization contact to establish a temporary conductive connection between the flash circuit board and the shutter blade, and an electrically conductive return spring interconnecting the flash circuit board and the shutter blade to establish a permanent conductive connection between the flash circuit board and the shutter blade and to urge the shutter blade to its lens covering position, is characterized in that the return spring is a non-conductive substance which is elastic to urge the shutter blade to its lens covering position and which is provided with a plurality of electrically conductive cross-woven strands to establish the permanent conductive connection between the flash circuit board and the shutter blade.

4 Claims, 5 Drawing Sheets

SHUTTER AND FLASH SYNCHRONIZATION ASSEMBLAGE

FIELD OF THE INVENTION

The invention relates generally to the field of photography, and in particular to a shutter and flash synchronization assemblage for a relatively inexpensive camera such as a one-time-use camera.

BACKGROUND OF THE INVENTION

The recently introduced electronic flash model of the "Kodak FunSaver Pocket camera", which is a one-time-use camera, includes a relatively compact shutter and flash synchronization assemblage.

The shutter and flash synchronization assemblage comprises a flash circuit board having a fixed shutter-flash synchronization contact, an electrically conductive shutter blade supported for movement between a lens covering position spaced from the synchronization contact and a lens uncovering position in abutment with the synchronization contact to establish a temporary conductive connection between the flash circuit board and the shutter blade, and an electrically conductive return spring interconnecting the flash circuit board and the shutter blade to establish a permanent conductive connection between the flash circuit board and the shutter blade and to urge the shutter blade to its lens covering position.

The return spring must be relatively tiny to allow the "Kodak FunSaver Pocket camera" to be small and pocketable. Consequently, the return spring is difficult to manufacture and, therefore, is a relatively expensive part.

SUMMARY OF THE INVENTION

A shutter and flash synchronization assemblage comprising a flash circuit board having a shutter-flash synchronization contact, an electrically conductive shutter blade supported for movement between a lens covering position spaced from the synchronization contact and a lens uncovering position in abutment with the synchronization contact to establish a temporary conductive connection between the flash circuit board and the shutter blade, and an electrically conductive return spring interconnecting the flash circuit board and the shutter blade to establish a permanent conductive connection between the flash circuit board and the shutter blade and to urge the shutter blade to its lens covering position, is characterized in that:

the return spring is a non-conductive substance, such as rubber, which is elastic to urge the shutter blade to its lens covering position and which is provided with a plurality of electrically conductive cross-woven strands, such as copper wire, to establish the permanent conductive connection between the flash circuit board and the shutter blade. By comparison to the return spring in the "Kodak FunSaver Pocket camera", the new spring is easier to manufacture and, therefore, is less expensive.

DETAILED DESCRIPTION OF THE INVENTION

The invention is disclosed as being embodied preferably in a one-time-use flash camera. Because the features of a one-time-use flash camera are generally known, the description which follows is directed in particular only to those elements forming part of or cooperating directly with the disclosed embodiment. It is to be understood, however, that other elements may take various forms known to a person of ordinary skill in the art.

Figure 1:
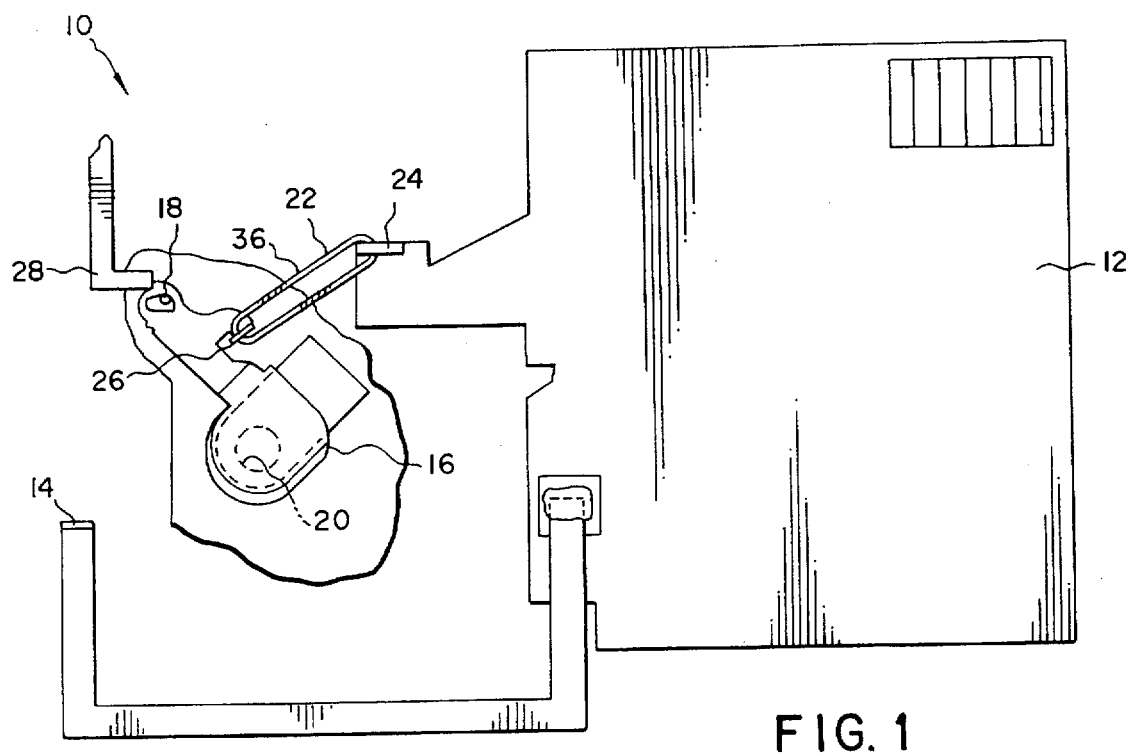
FIG. 1 is a front elevation view of a shutter and flash synchronization assemblage according to a preferred embodiment of the invention, showing a shutter blade in a lens covering position.
Figure 2:
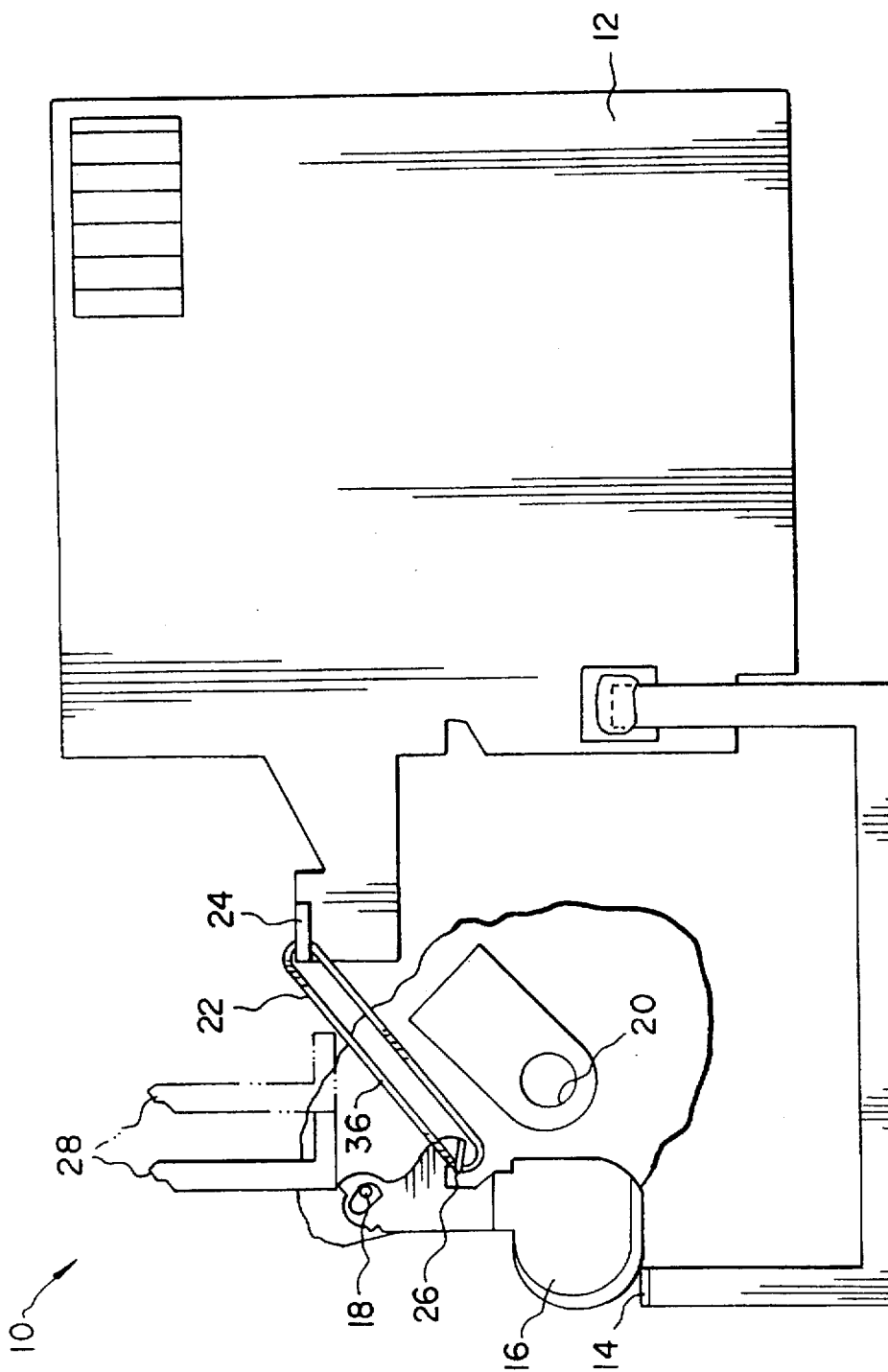
FIG. 2 is a front elevation view of the shutter and flash synchronization assemblage, showing the shutter blade in a lens uncovering position.

Referring now to the drawings, FIGS. 1 and 2 show a shutter and flash synchronization assemblage 10 comprising a known electronic flash circuit board 12 having a fixed shutter-flash synchronization contact 14, an electrically conductive (metal) shutter blade 16 supported on a pin 18 for pivotal movement between an original lens covering position over a lens opening 20 and spaced from the synchronization contact (as shown in FIG. 1) and a momentary lens uncovering position separated from the lens opening and in abutment with the synchronization contact to establish a temporary conductive connection between the flash circuit board and the shutter blade (as shown in FIG. 2), and an electrically conductive return spring 22 interconnecting the flash circuit board and the shutter blade to establish a permanent conductive connection between the flash circuit board and the shutter blade and to urge the shutter blade to its lens covering position. The return spring 22 is a continuous band which is engaged at opposite ends via a contact-retainer 24 of the circuit board 12 and a contact-retainer 26 of the shutter blade 16. When a shutter release button (not shown) is manually depressed to make a flash exposure, a known high-energy lever 28 first impacts against the shutter blade 16 to pivot the shutter blade from its lens covering position to its lens uncovering position and then moves past the shutter blade to permit the return spring to return the shutter blade to its lens covering position.

Figure 3:
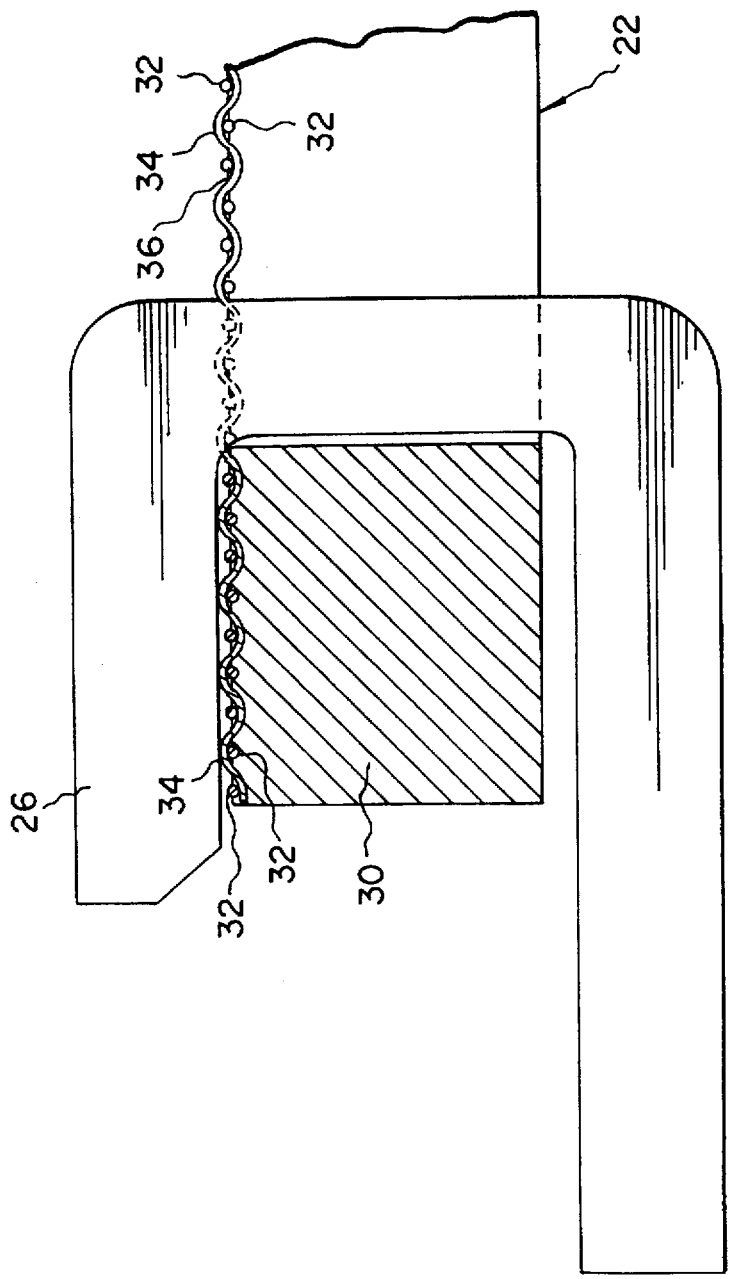
FIG. 3 is a top plan view of a return spring for the shutter blade, provided with electrically conductive cross-woven strands, and showing the return spring in a relaxed condition when the shutter blade is in its lens covering position as in FIG. 1.
Figure 4:
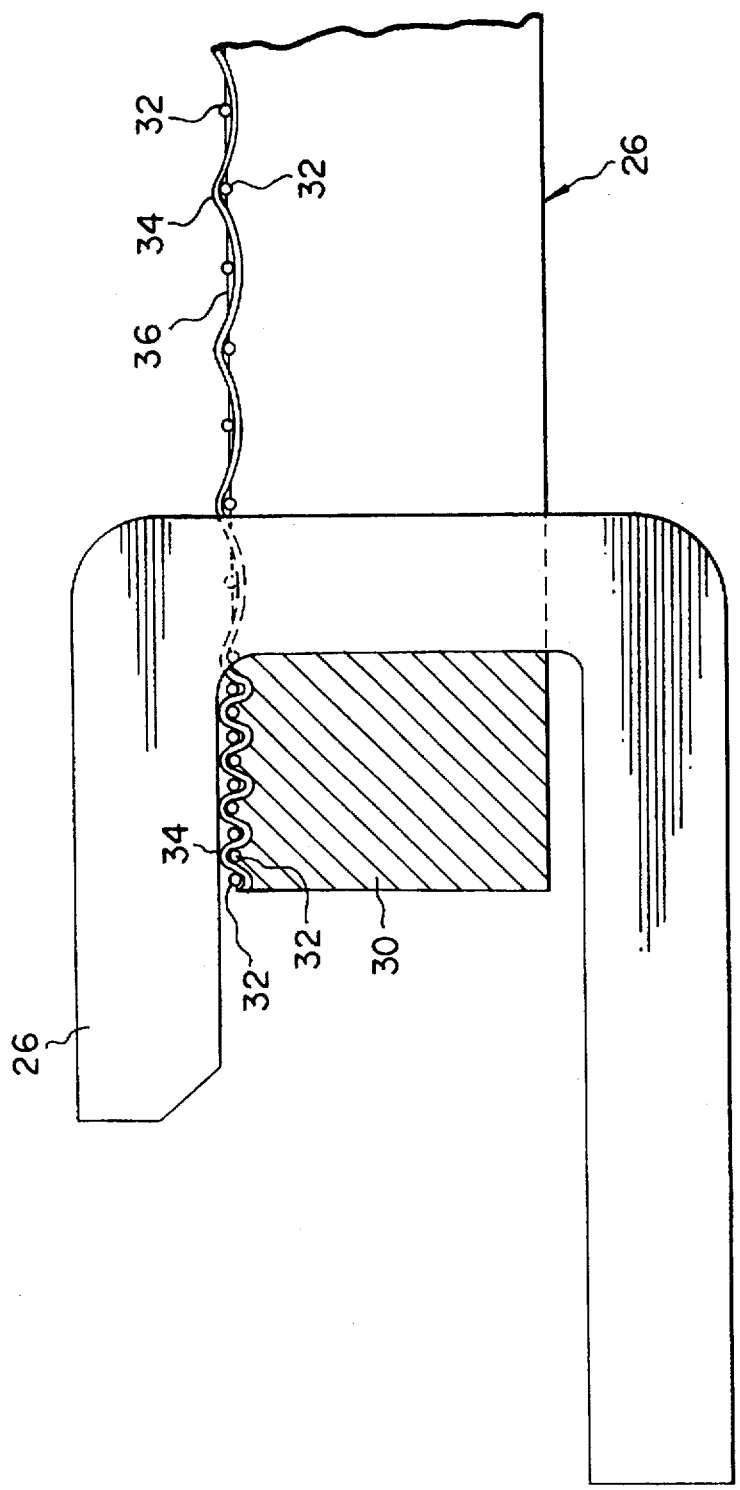
FIG. 4 is a top plan view of the return spring for the shutter blade, showing the return spring in a tensioned or stretched condition when the shutter blade is in its lens uncovering position as in FIG. 2.
Figure 5:
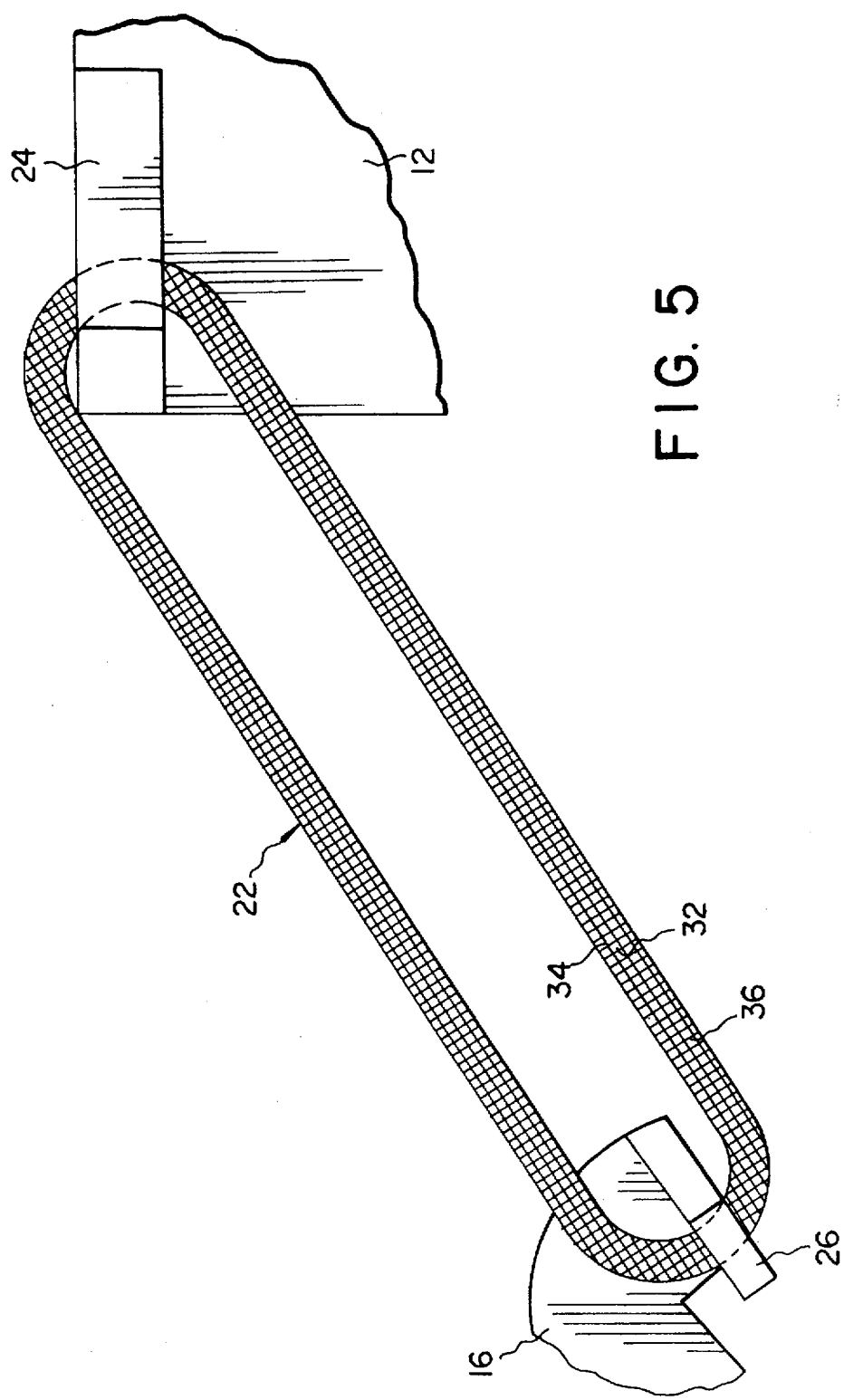
FIG. 5 is a front elevation view of the return spring in its relaxed condition, detailing the cross-woven strands.

According to the invention, the return spring 22 is a non-conductive substance 30, such as rubber, which is elastic to urge the shutter blade 16 to its lens covering position and which is provided with respective first and second sets of electrically conductive cross-woven (e.g. perpendicular) strands 32 and 34, such as copper wire, to establish the permanent conductive connection between the flash circuit board 12 and the shutter blade. FIGS. 3 and 5 show the return spring 22, including the two sets of cross-woven strands 32 and 34, and depict the return spring in a relaxed condition when the shutter blade 16 is in its lens covering position as in FIG. 1. FIG. 4 shows the return spring 22, including the two sets of cross-woven strands 32 and 34, and depicts the return spring in a tensioned or stretched condition when the shutter blade 16 is in its lens uncovering position as in FIG. 2. The non-conductive substance 30 of the return spring 22 has a longitudinal exterior surface 36, and the two sets of cross-woven strands 32 and 34 are partially embedded along the exterior surface. See FIGS. 3 and 4. The first set of strands 32 is a parallel-strand set in which the strands longitudinally extend widthwise across the exterior surface 36. The second set of strands 34 is a parallel-strand set in which the strands longitudinally extending lengthwise along the exterior surface 36 over and under successive ones of the strands 32 in the first set. See FIGS. 3 and 5.

The invention has been described with reference to a preferred embodiment. However, it will be appreciated that variations and modifications can be effected by a person of ordinary skill in the art without departing from the scope of the invention.

PARTS LIST 10. shutter and flash synchronization assemblage
12. electronic flash circuit board
14. shutter-flash synchronization contact
16. shutter blade
18. pin
20. lens opening
22. return spring
24. contact-retainer
26. contact-retainer
28. high-energy lever
30. non-conductive substance
32. first set of parallel strands
34. second set of parallel strands
36. exterior surface

What is claimed is:

1. A camera sub-assembly comprising a circuit board having a fixed contact, an electrically conductive movable part supported for movement between a first position spaced from said fixed contact and a second in abutment with the fixed contact to establish a temporary conductive connection between said circuit board and said movable part, and an electrically conductive return spring interconnecting said circuit board and said movable part to establish a permanent conductive connection between the circuit board and the movable part and to urge the movable part to its first position, is characterized in that:

said return spring is a non-conductive substance which is elastic to urge said movable part to its first position and which is provided with a plurality of electrically conductive cross-woven strands to establish the permanent conductive connection between said circuit board and said movable part.

2. A shutter and flash synchronization assemblage comprising a flash circuit board having a shutter-flash synchronization contact, an electrically conductive shutter blade supported for movement between a lens covering position spaced from said synchronization contact and a lens uncovering position in abutment with the synchronization contact to establish a temporary conductive connection between said flash circuit board and said shutter blade, and an electrically conductive return spring interconnecting said flash circuit board and said shutter blade to establish a permanent conductive connection between the flash circuit board and the shutter blade and to urge the shutter blade to its lens covering position, is characterized in that:

said return spring is a non-conductive substance which is elastic to urge said shutter blade to its lens covering position and which is provided with a plurality of electrically conductive cross-woven strands to establish the permanent conductive connection between said flash circuit board and said shutter blade.

3. A shutter and flash synchronization assemblage as recited in claim 2, wherein said non-conductive substance has a longitudinal exterior surface, and said cross-woven strands are partially embedded along said exterior surface.

4. A shutter and flash synchronization assemblage as recited in claim 3, wherein said cross-woven strands include a first set of parallel strands longitudinally extending widthwise across said exterior surface and a second set of parallel strands longitudinally extending lengthwise along the exterior surface over and under successive ones of the parallel strands of said first set.

* * * * *